US010230669B2

(12) United States Patent
Gal-Tzur et al.

(10) Patent No.: US 10,230,669 B2
(45) Date of Patent: *Mar. 12, 2019

(54) REAL-TIME NOTIFICATIONS OF CONCURRENT EMAIL THREAD REPLIES

(71) Applicant: International Business Machines Corporation, Armonk, NY (US)

(72) Inventors: Zeev Gal-Tzur, Zicron Takov (IL); Gili Nachum, Bet shemesh (IL); Itai Zapler, Moshav Yashresh (IL)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/957,093

(22) Filed: Apr. 19, 2018

(65) Prior Publication Data
US 2018/0219811 A1 Aug. 2, 2018

Related U.S. Application Data

(63) Continuation of application No. 15/086,191, filed on Mar. 31, 2016.

(51) Int. Cl.
H04L 12/58 (2006.01)
G06F 9/54 (2006.01)
(Continued)

(52) U.S. Cl.
CPC .............. H04L 51/04 (2013.01); G06F 9/542 (2013.01); G06Q 10/10 (2013.01); H04L 41/026 (2013.01);
(Continued)

(58) Field of Classification Search
CPC ....... H04L 51/24; H04L 51/043; H04L 51/36; H04L 41/026; H04L 61/1564;
(Continued)

(56) References Cited

U.S. PATENT DOCUMENTS 7,328,242 B1 * 2/2008 McCarthy .............. G06Q 10/10
709/203
7,552,178 B2 6/2009 Chen et al.
(Continued)

OTHER PUBLICATIONS

Disclosed Anonymously et al., "A Method About Email Responses Reconciliation for Consolidating Information From Multiple Recipients", An IP.com Prior Art Database Technical Disclosure, IP.com No. 000240071, 6 pages.
(Continued)

Primary Examiner — Le H Luu
(74) Attorney, Agent, or Firm — Andrew Aubert

(57) ABSTRACT

In an embodiment of the present invention, a first message is determined. The first message is associated with two or more users. The two or more users include a sender of the first message and one or more recipients of the first message. In response to determining that a first user of the two or more users is currently generating a second message, which is a response to the first message, it is determined whether a second user of the two or more users of the first message is currently generating a third message, which is a response to the first message. In response to determining that the second user is currently generating the third message, the first user is notified that the second user is currently generating the third message, and the second user is notified that the first user is currently generating the second message.

1 Claim, 3 Drawing Sheets

(51) Int. Cl.
   *G06Q 10/10* (2012.01)
   *H04L 12/24* (2006.01)
   *H04L 29/12* (2006.01)

(52) U.S. Cl.
   CPC .......... *H04L 51/043* (2013.01); *H04L 51/22* (2013.01); *H04L 51/24* (2013.01); *H04L 51/36* (2013.01); *H04L 61/1564* (2013.01)

(58) Field of Classification Search
   CPC ............ H04L 67/1059; H04L 12/1836; H04L 12/1827; G06F 9/542; G06Q 10/10; G06Q 10/109; H04W 4/14; H04M 1/72547
   See application file for complete search history.

(56) References Cited

U.S. PATENT DOCUMENTS

| | | | |
|---|---|---|---|
| 7,818,375 | B2 | 10/2010 | Malik |
| 8,762,475 | B2 | 6/2014 | Cheung et al. |
| 9,021,372 | B2 | 4/2015 | Anderson |
| 9,391,940 | B2 | 7/2016 | Lin |
| 9,742,715 | B1* | 8/2017 | Chavez ................ H04L 51/22 |
| 9,935,911 | B2 | 4/2018 | Gal-Tzur et al. |
| 2004/0015548 | A1* | 1/2004 | Lee ................ H04L 12/1827 709/204 |
| 2009/0254620 | A1 | 10/2009 | Best et al. |
| 2010/0087169 | A1 | 4/2010 | Lin et al. |
| 2012/0072507 | A1* | 3/2012 | Chen ................ H04L 12/1836 709/206 |
| 2012/0143960 | A1 | 6/2012 | Corrao et al. |
| 2013/0157627 | A1* | 6/2013 | Talwar .................... H04W 4/14 455/413 |
| 2014/0222933 | A1* | 8/2014 | Stovicek .......... H04M 1/72547 709/206 |
| 2015/0127465 | A1* | 5/2015 | Bonev .................. G06Q 10/109 705/14.66 |
| 2016/0065519 | A1 | 3/2016 | Waltermann et al. |
| 2016/0212091 | A1 | 7/2016 | Volach |
| 2016/0269336 | A1* | 9/2016 | Blinder .................. H04L 51/22 |
| 2017/0180297 | A1 | 6/2017 | Friend |
| 2017/0201575 | A1* | 7/2017 | Song .................. H04L 67/1059 |
| 2017/0272388 | A1* | 9/2017 | Bern ...................... H04L 51/22 |
| 2017/0289072 | A1 | 10/2017 | Gal-Tzur et al. |

OTHER PUBLICATIONS

Gal-Tzur et al., "Real-Time Notifications of Concurrent Email Thread Replies", U.S. Appl. No. 15/947,139 filed Apr. 6, 2018.
"Authentication Sequence", Web Sequence Diagrams, Printed on Dec. 2, 2015, 1 page, <https://www.websequencediagrams.com/>.
"Email Thread", What is an Email Thread?—Definition from Techopedia, Printed on Dec. 2, 2105, 1 page, <https://www.techopedia.com/definition/1503/email-thread>.
List of IBM Patents or Patent Applications Treated as Related, filed Apr. 19, 2018, 2 pages.

* cited by examiner

REAL-TIME NOTIFICATIONS OF CONCURRENT EMAIL THREAD REPLIES

BACKGROUND OF THE INVENTION

The present invention relates generally to the field of electronic mail, and more particularly to real-time notification of concurrent email composers in a thread.

Electronic mail, or emails, are digital messages that are exchanged between a sender and one or more recipients. Emails are transferred between devices connected over a network, such as the Internet. Email applications, which allow a user to access, compose, and otherwise utilize emails of the user, operate on a client-server model whereby an email is transferred by an email application to a server where they are stored for a recipient. Email thereby provides asynchronous, as opposed to real-time, correspondence between a sender of a message and a recipient of the message.

SUMMARY

Embodiments of the present invention include a method, computer program product, and system for providing real-time communication in electronic message threads. In an embodiment of the present invention, a first message is determined. The first message is associated with two or more users. The two or more users include a sender of the first message and one or more recipients of the first message. Whether a first user of the two or more users of the first message is currently generating a second message is determined. The second message is a response to the first message. In response to determining that a first user of the two or more users is currently generating a second message, it is determined whether a second user of the two or more users of the first message is currently generating a third message. The third message is a response to the first message. In response to determining that the second user is currently generating the third message, the first user is notified that the second user is currently generating the third message and the second user is notified that the first user is currently generating the second message.

DETAILED DESCRIPTION

Embodiments of the present invention recognize that society relies heavily on email communication. Embodiments of the present invention recognize that having multiple recipients of a single email can cause problems for both the sender and the recipients, causing confusion and unnecessary delays in collaboration. Embodiments of the present invention further recognize that such problems result from the asynchronous nature of communicating through email. For example, multiple recipients of the same email cannot know about the intentions of each other recipient to reply to the email, which can cause uncoordinated responses and further confusion and delays.

Embodiments of the present invention provide for real-time notifications to email users in situations involving concurrent replies in a single email thread.

An email thread is a group of emails that includes an original email, all emails sent in reply to the original email (reply emails), and all emails sent in reply to a reply email. In response to a recipient opening an email that is part of an email thread, the email application of the recipient typically displays the whole email thread (i.e., all emails of the email thread).

Figure 1:
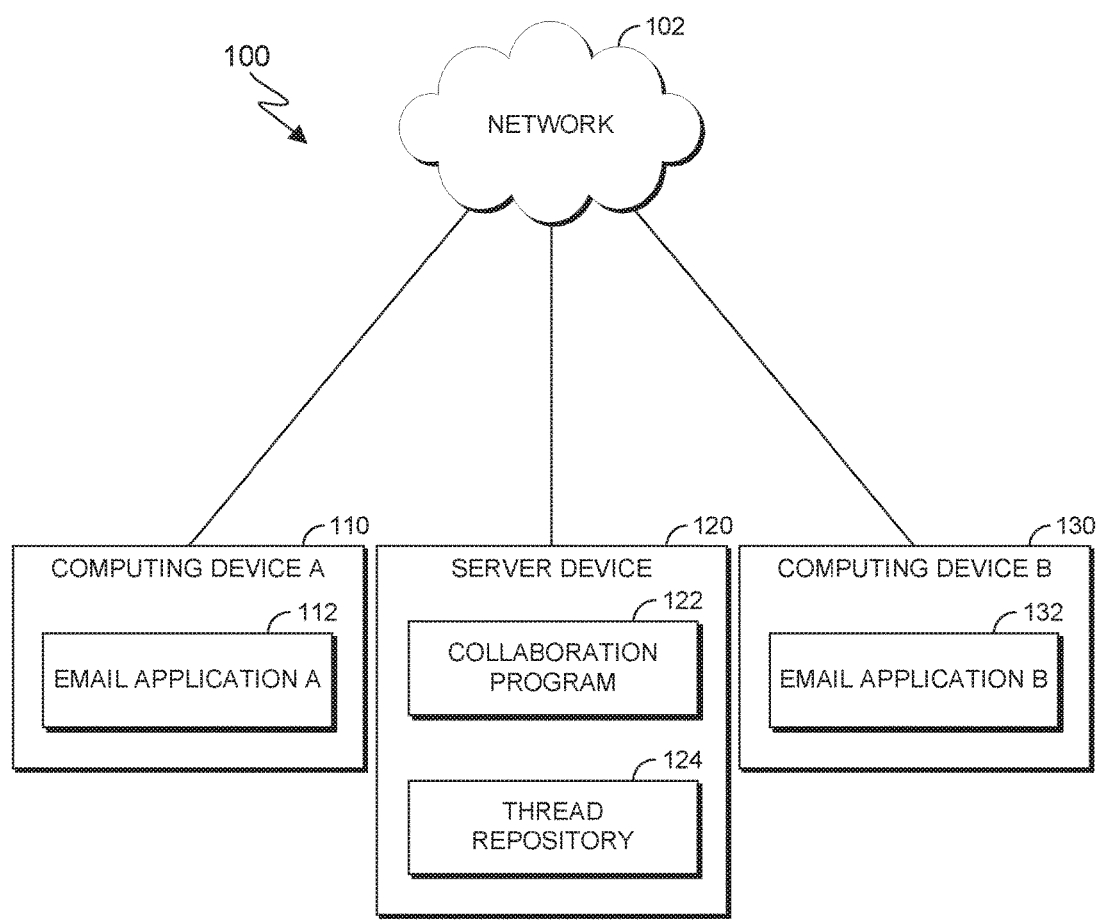
FIG. 1 is a functional block diagram of a distributed data processing environment, in accordance with an embodiment of the present invention.

The present invention will now be described in detail with reference to the Figures. FIG. 1 is a functional block diagram of a computing environment, generally designated 100, in accordance with an embodiment of the present invention. FIG. 1 provides only an illustration of one implementation and does not imply any limitations with regard to the environments in which different embodiments may be implemented. Those skilled in the art may make many modifications to the depicted environment without departing from the scope of the invention as recited by the claims.

In an embodiment, distributed data processing environment 100 includes computing device A 110, server device 120, and computing device B 130. Computing device A 110, server device 120, and computing device B 130 are interconnected through network 102. In an embodiment, distributed data processing environment 100 may additionally include any other device connected to network 102.

In an embodiment, network 102 may be a local area network (LAN), a telecommunications network, a wide area network (WAN) such as the Internet, or any combination of the three, and network 102 may include wired, wireless, or fiber optic connections. In an embodiment, network 102 may generally be any combination of connections and protocols that support communications between computing device A 110, server device 120, computing device B 130 and any other computing device connected to network 102, in accordance with embodiments of the present invention.

In an embodiment, computing device A 110 may generally be any electronic device or combination of electronic devices capable of executing computer readable program instructions. In example embodiments, computing device A 110 may be a personal computer, workstation, tablet computer, mobile phone, or personal digital assistant. In an embodiment, computing device A 110 may be a computer system utilizing clustered computers and components (e.g., database server devices or application server devices) that act as a single pool of seamless resources when accessed by elements of distributed data processing environment 100, such as in a cloud computing environment. In an embodiment, computing device A 110 may include components depicted and described with respect to FIG. 3. In an embodiment, computing device B 130 may be substantially similar to computing device A 110 and may include substantially similar components.

In an embodiment, computing device A 110 includes email application A 112. In an alternative embodiment, email application A 112 may be located on another computing device (not shown) connected to network 102. In an embodiment, email application A 112 may generally be a computer program, application, subprogram of a larger program, or combination thereof that provides functions for handling emails and transferring emails between computing device A 110 and server device 120.

In an embodiment, email application A 112 may provide functions for handling and transferring emails such as sending, receiving, retrieving, displaying, composing, responding to (e.g., replying to, forwarding), and deleting emails. In an embodiment, email application A 112 may provide organizational features such as an inbox for received emails as well as folders for displaying various categories of stored emails such as sent emails, drafted emails, deleted emails, and important emails. In an embodiment, email application A 112 may additionally provide functions for organizing a schedule of a user such as a calendar and reminder notifications. In an embodiment, email application A 112 communicates with collaboration program 122 including notifying collaboration program 122 when an email is being composed by a user of email application 112. In an embodiment, email application A 112 may include one or more user interface devices (not shown) to allow a user to utilize email application A 112. In an embodiment, email application B 132 may be substantially similar to email application A 112.

A user interface is the information, such as graphic, text, and sound, a program presents to a user and the control sequences the user employs to control the program. There are many types of user interfaces. For example, the user interface may be a graphical user interface (GUI). A GUI is a type of user interface that allows users to interact with electronic devices, such as a keyboard and mouse, through graphical icons and visual indicators, such as secondary notations, as opposed to text-based interfaces, typed command labels, or text navigation. GUIs were introduced for computers in response to the perceived steep learning curve of command-line interfaces, which required commands to be typed on the keyboard. The actions in GUIs may be performed by a user through direct manipulation of the graphical elements.

In an embodiment, server device 120 may generally be any electronic device or combination of electronic devices capable of executing computer readable program instructions. In example embodiments, server device 120 may be a workstation, personal computer, personal digital assistant, or mobile phone. In an embodiment, server device 120 may be a computer system utilizing clustered computers and components (e.g., database server devices or application server devices) that act as a single pool of seamless resources when accessed by elements of distributed data processing environment 100, such as in a cloud computing environment. In an embodiment, server device 120 may include components depicted and described with respect to FIG. 3.

In an embodiment, server device 120 includes collaboration program 122. In an alternative embodiment, collaboration program 122 may be located on computing device A 110 or computing device B 130. In yet another alternative embodiment, collaboration program 122 may be located on another computing device (not shown) connected to network 102. In an embodiment, collaboration program 122 may generally be a computer program, application, subprogram of a larger program, or combination thereof that provides real-time notifications to concurrent email composers in a common email thread.

In an embodiment, collaboration program 122 accesses and communicates with email application A 112, email application B 132, and thread repository 124 for providing real-time notifications of concurrent responses in an email thread of which users of email application A 112 and email application B 132 are participants. Collaboration program 122 provides functions that include determining a thread, creating a thread identifier, determining and sending status information of a user of a thread, providing privacy options, and providing access to real-time communication tools, in accordance with embodiments of the present invention.

In an embodiment, server device 120 includes thread repository 124. In an alternative embodiment, thread repository 124 may be located on computing device A 110 or computing device B 130. In yet another alternative embodiment, thread repository 124 may be located on another computing device (not shown) connected to network 102. In an embodiment, thread repository 124 may generally be a storage location for identifying information and status information of emails of the users of email application A 112 and email application B 132.

In an embodiment, thread repository 124 contains identifying information of users of email application A 112 and users of email application B 132 and status information regarding email thread activity of users of email application A 112 and users of email application B 132. In an embodiment, identifying information may include message identifiers of each email of the thread (e.g., values of fields such as message-ID, in-reply-to, references, thread-index, thread-topic, etc.) and a user identifier of each user of each email (e.g., the email address of each recipient and the email address of the sender). In an embodiment, status information regarding email thread activity may include whether a user of the thread is currently generating an email in the thread or whether the user is no longer generating the email. Collaboration program 122 may access thread repository 124 to add to, remove, or otherwise update the identifying and status information stored in thread repository 124, in accordance with embodiments of the present invention. For example, collaboration program 122 may publish, in thread repository 124, an indication of the composing status of a thread user, the email address of the thread user, and the message-ID of the email being generated.

In an embodiment, thread repository 124 may be implemented using any non-volatile storage media known in the art. For example, thread repository 124 may be implemented with a tape library, optical library, one or more independent hard disk drives, or multiple hard disk drives in a redundant array of independent disks (RAID). Thread repository 124 may be implemented using any suitable storage architecture known in the art. For example, thread repository 124 may be implemented with a relational database or an object-oriented database.

Figure 2:
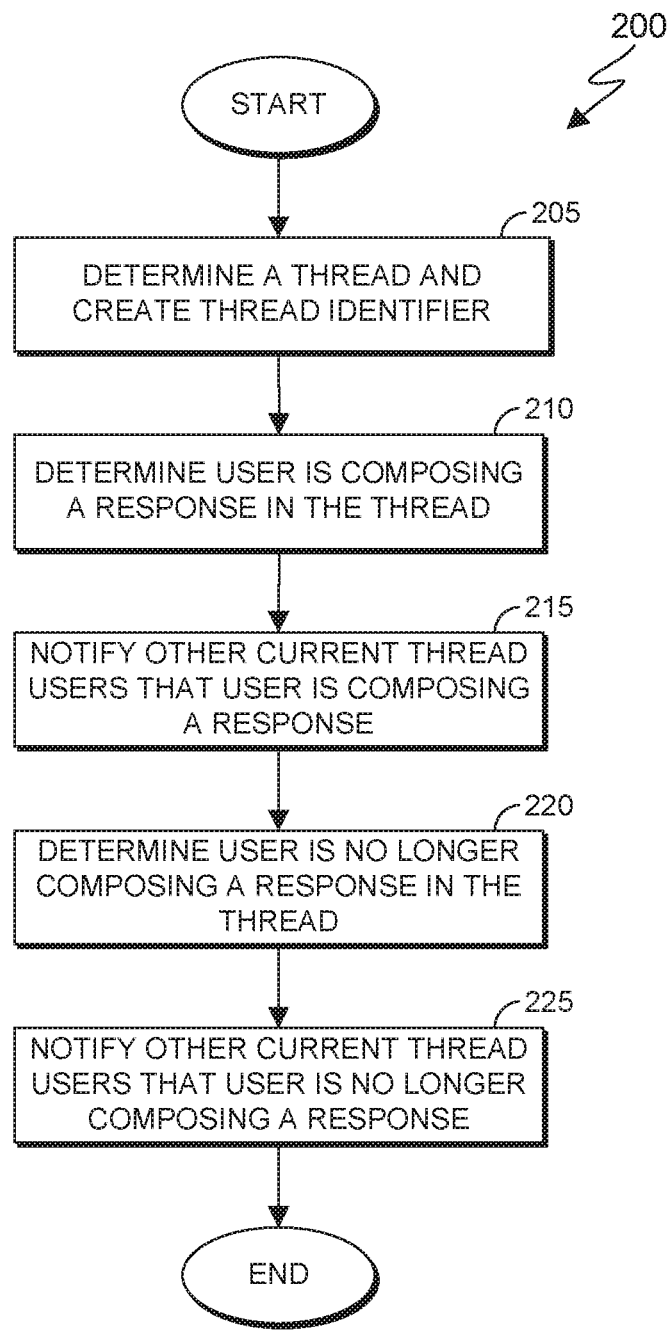
FIG. 2 is a flowchart of operational steps for providing real-time notifications of concurrent replies in an email thread, in accordance with an embodiment of the present invention.

FIG. 2 is a flowchart of workflow 200 illustrating operational steps for providing real-time notifications of concurrent replies in an email thread. In the illustrated embodiment, the steps of workflow 200 is performed by collaboration program 122. In an alternative embodiment, steps of workflow may be performed by any other computer program, or programs, while working with collaboration program 122. In an embodiment, collaboration program 122 begins performing the steps of workflow 200 in response to receiving an indication to by a user to provide real-time notifications of concurrent replies in an email thread. In an embodiment, a user of computing device A 110 may provide such an indication through the user interface of email application A 112 and a user of computing device B 130 may provide such an indication through the user interface of email application B 132.

Collaboration program 122 determines a thread and creates a thread identifier (step 205). In other words, collaboration program 122 identifies an email thread and creates a thread identifier corresponding to the thread. In an embodiment, collaboration program 122 determines a thread in response to determining that a user of an original delivered email, such as any recipient of the email or the sender of the email, is composing a response email, such as a reply email or a forward email to the original email. For example, an original sender may send an email to two classmates, user A and user B, regarding a school project. User A may begin composing a reply email to be sent to user B and the original sender to suggest a strategy for the project. Collaboration program 122 may determine a thread in response to user A composing the reply email to user B and the original sender. In an embodiment, the response email may include a new recipient that was not a recipient of the original email.

In an embodiment, collaboration program 122 determines that the user (user A) is composing the response email upon receiving an indication from the email client of the user (email application A 112) that the user is currently composing a response email or, in other words, that the email client of the user is currently generating a response email. For example, email application A 112 may send the indication to collaboration program 122 upon user A clicking the "reply" button, through the user interface of email application A 112, to begin generating the reply email to user B and the original sender. In an embodiment, the indication from email application A 112 includes identifying information, which may include message identifiers of the response email (e.g., values of fields such as message-ID, in-reply-to, references, thread-index, thread-topic, etc.) and a user identifier of each user of the response email (e.g., the email address of each recipient (user B and the original sender) and the email address of the sender (user A)).

In an embodiment, collaboration program 122 creates a thread identifier that is unique to the thread and serves as an identifier of the thread for collaboration program 122. In an embodiment, collaboration program 122 creates the identifier based on the identifying information received from email application A 112. In an embodiment, collaboration program 122 maintains and updates the thread identifier in thread repository 124 as the steps of workflow 200 are performed. For example, in an embodiment, collaboration program 122 maintains a list of all past and current users of a thread (i.e., the thread identifier) and updates the list based on the identifying information determined with each generated response email in the thread.

In an embodiment, collaboration program 122 subscribes user A to the thread identifier. As a result, user A may, for example, receive notifications from collaboration program 122 that another thread user is concurrently composing a response email in the thread (discussed in step 215). In an embodiment, collaboration program 122 updates the thread identifier to indicate that user A is generating a response email (a composing status). As a result, another thread user, upon composing another response email to the thread and being subscribed to the thread identifier, may, for example, receive a notification of the composing status of user A.

Collaboration program 122 determines that a user is composing a response in the thread (step 210). In other words, collaboration program 122 determines that a thread user, such as any recipient or sender of any delivered email in the thread, is composing a response email to one or more other thread users or to a new user. For example, user B may begin composing an email to user A and the original sender in reply to the original school project email in order to suggest a project timeline, and collaboration program 122 may determine that user B is composing a response email to be sent to user A and the original sender. In an embodiment, collaboration program 122 determines that user B is composing a response email upon receiving an indication from email application B 132 that user B is currently composing a response email. In an embodiment, in response to determining that user B is composing a response email in the thread, collaboration program 122 subscribes user B to the thread identifier.

Collaboration program 122 notifies other current thread users that the user is composing a response (step 215). In other words, collaboration program 122 notifies any thread users that are currently composing a response email in the thread identifier that another user is composing a response email. For example, collaboration program 122 may notify user A, the other user subscribed to the thread (i.e., the other user currently composing a response email in the thread), that user B is currently composing a response email in the thread. In an embodiment, collaboration program 122 publishes an indication (or notification) to the thread identifier that user B is composing a response email, and email application A 112 receives the indication and notifies user A through the user interface of email application A 112. In an embodiment, collaboration program 122 notifies other current thread users that the response email currently being composed includes a new recipient (i.e., a recipient who was not a recipient of the original email).

In an embodiment, prior to notifying other thread users that a user is currently composing a response, collaboration program 122 provides a privacy option for the composing user to indicate that other thread users, or particular thread users, should not receive a notification of the composing status of the user. For example, upon receiving an indication from email application B 132 that user B is composing a response and prior to publishing the composing status of user B to the thread identifier, collaboration program 122 may provide a privacy option for user B to allow user B to compose the response without notifying user A and without providing an option to user A for real-time communication with user B (discussed subsequently).

In an embodiment, collaboration program 122 provides an option to, or otherwise receives an indication from, the original sender of the original email of the thread (discussed in step 205) to not provide the privacy option to composing users and to always notify other thread users of a composing status of a thread user. For example, in response to receiving an indication from the email client (not shown) of the original sender, collaboration program 122 may provide an option for the original sender to indicate that a privacy option should not be provided to future thread users of a future thread that includes the original school project email.

In an embodiment, collaboration program 122 provides an option for real-time communication with the composing thread user. In other words, in addition to providing the other current thread users subscribed to the thread identifier a notification that a thread user is currently composing a response, collaboration program 122 provides an option to each current thread user to engage in real-time communication with the composing thread user, and collaboration program 122 provides an option to the composing thread user to engage in real-time communication with one or more other current thread users. For example, in response to user B composing a response email while user A is currently subscribed (i.e., also currently composing a response email), collaboration program 122 may provide user A an option to engage in real-time communication with user B through an instant messaging application (not shown), which may allow user A and user B to discuss the strategy and timeline of the school project more efficiently. In an embodiment, real-time communication may include tools for instant messaging, telephone, and A/V meeting (e.g., video messaging).

Collaboration program 122 determines that the user is no longer composing a response in the thread (step 220). In other words, collaboration program 122 determines that the composing thread user is no longer composing a response email to one or more other thread users or to a new user. For example, collaboration program 122 may determine that user B is no longer composing the response email to user A and the original sender. In an embodiment, collaboration program 122 determines that user B is no longer composing a response email upon receiving an indication from email application B 132 that user B is no longer composing a response email. For example, email application B 132 may send such indication to collaboration program 122 that user B is no longer composing the response email upon user B sending the response email to user A or, alternatively, upon user B closing the response email window through the user interface of email application B 132. In an embodiment, in response to determining that user B is no longer composing a response email in the thread, collaboration program 122 removes user B from the thread identifier.

Collaboration program 122 notifies other current users that the user is no longer composing a response (step 225). In other words, collaboration program 122 notifies the other thread users currently composing a response email (i.e., currently subscribed to the thread identifier) that the user is no longer composing a response email. In an embodiment, collaboration program 122 publishes an indication (or notification) to the thread identifier that user B is no longer composing a response email, and email application A 112 receives the indication and notifies user A through the user interface of email application A 112.

Figure 3:
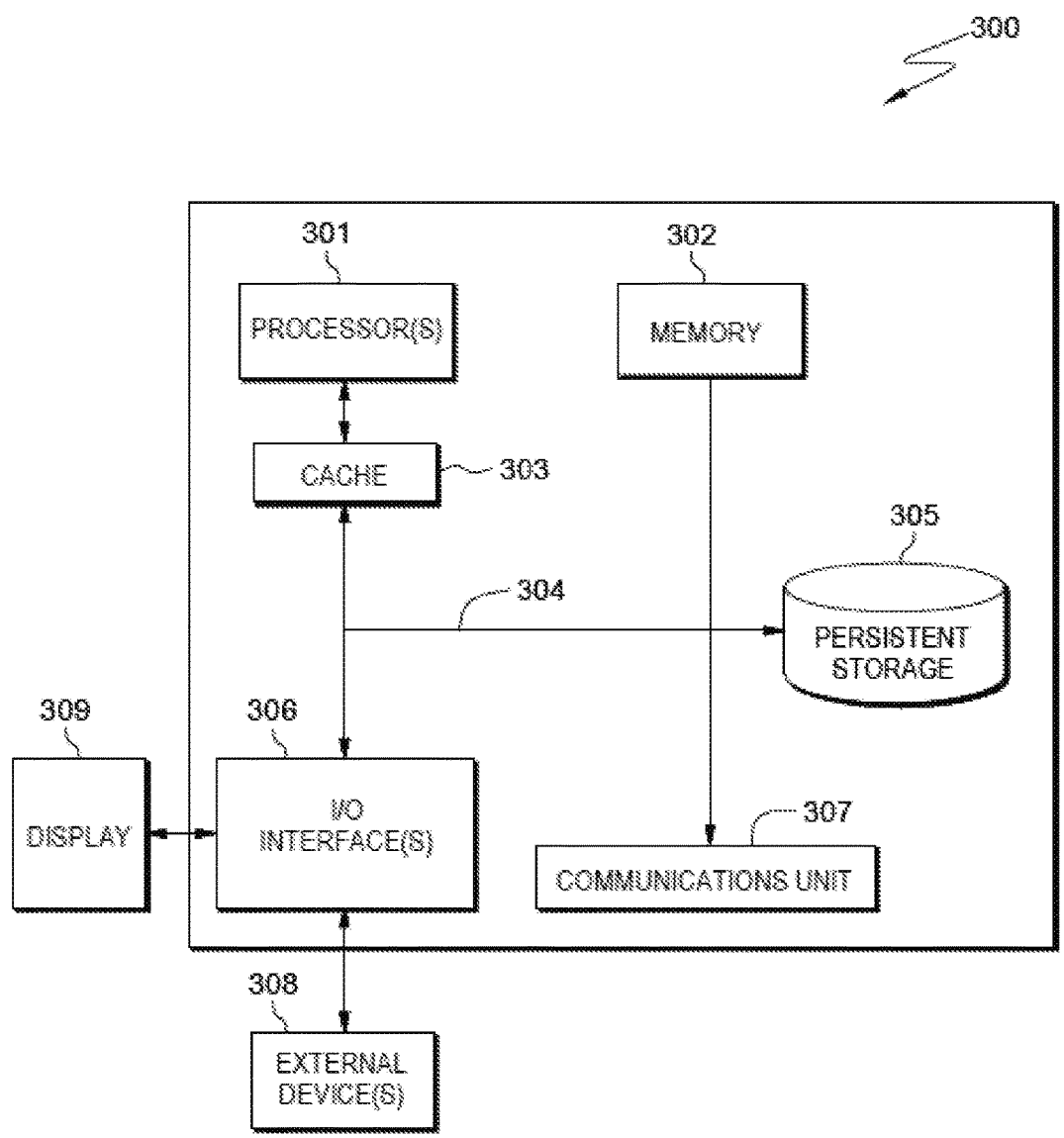
FIG. 3 is a functional block diagram of components of the computing devices of FIG. 1, in accordance with an embodiment of the present invention.

FIG. 3 depicts computing system 300, which illustrates components of computing device A 110, computing device B 130, and server device 120, which may include collaboration program 122 (not shown in FIG. 3). Computing system 300 includes processor(s) 301, cache 303, memory 302, persistent storage 305, communications unit 307, I/O interface(s) 306, and communications fabric 304. Communications fabric 304 provides communications between cache 303, memory 302, persistent storage 305, communications unit 307, and I/O interface(s) 306. Communications fabric 304 can be implemented with any architecture designed for passing data and/or control information between processors (e.g., microprocessors, communications and network processors, etc.), system memory, peripheral devices, and any other hardware components within a system. For example, communications fabric 304 may be implemented with one or more buses or a crossbar switch.

Memory 302 and persistent storage 305 are computer readable storage media. In an embodiment, memory 302 includes random access memory (RAM) (not shown). In general, memory 302 may include any suitable volatile or non-volatile computer readable storage media. Cache 303 is a fast memory that enhances the performance of processors 301 by holding recently accessed data, and data near recently accessed data, from memory 302.

Program instructions and data used to practice embodiments of the present invention may be stored in persistent storage 305 and in memory 302 for execution by one or more of the respective processors 301 via cache 303. In an embodiment, persistent storage 305 includes a magnetic hard disk drive. Alternatively, or in addition to a magnetic hard disk drive, persistent storage 305 may include a solid state hard drive, a semiconductor storage device, read-only memory (ROM), erasable programmable read-only memory (EPROM), flash memory, or any other computer readable storage media that is capable of storing program instructions or digital information.

The media used by persistent storage 305 may also be removable. For example, a removable hard drive may be used for persistent storage 305. Other examples include optical and magnetic disks, thumb drives, and smart cards that are inserted into a drive for transfer onto another computer readable storage medium that is also part of persistent storage 305.

Communications unit 307, in these examples, provides for communications with other data processing systems or devices. In these examples, communications unit 307 includes one or more network interface cards. Communications unit 307 may provide communications through the use of either or both physical and wireless communications links. Program instructions and data used to practice embodiments of the present invention may be downloaded to persistent storage 305 through communications unit 307.

I/O interface(s) 306 allows for input and output of data with other devices that may be connected to each computer system. For example, I/O interface 306 may provide a connection to external devices 308 such as a keyboard, keypad, a touch screen, and/or some other suitable input device. External devices 308 can also include portable computer readable storage media such as, for example, thumb drives, portable optical or magnetic disks, and memory cards. Software and data used to practice embodiments of the present invention can be stored on such portable computer readable storage media and can be loaded onto persistent storage 305 through I/O interface(s) 306. I/O interface(s) 306 also connect to display 309.

Display 309 provides a mechanism to display data to a user and may be, for example, a computer monitor.

The descriptions of the various embodiments of the present invention have been presented for purposes of illustration, but are not intended to be exhaustive or limited to the embodiments disclosed. Modifications and variations of the presented embodiments will be apparent to those of ordinary skill in the art without departing from the scope and spirit of the invention. The terminology used herein was chosen to best explain the principles of the embodiment, to best explain the practical application or technical improvement over technologies found in the marketplace, or to enable others of ordinary skill in the art to understand the embodiments disclosed herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer system comprising:
   a one or more processors;
   a machine readable storage device; and
   computer code stored on the machine readable storage device, with the computer code including instructions for causing the one or more processors to perform operations including the following:
      determining, by one or more computer processors, a first message, wherein:
         the first message is associated with two or more users,
         the two or more users include a sender of the first message, and
         the two or more users include one or more recipients of the first message,
      responsive to determining that a first user of the two or more users is generating a second message, wherein the second message is a response to the first message, generating, by one or more computer processors, a thread identifier based at least in part on the following: a message identifier of the first message, a user identifier of each user of the two or more users, a message identifier of the second message, and a user identifier of each recipient of one or more recipients of the second message, responsive to determining that the first user is generating the second message, publishing, by one or more computer processors, an indication to the thread identifier that the first user is generating the second message, responsive to determining that a second user of the two or more users is generating a third message, wherein the third message is a response to the first message, publishing, by one or more computer processors, an indication to the thread identifier that the second user is generating the third message, responsive to publishing the indication to the thread identifier that the second user is generating the third message, notifying, by one or more computer processors, the first user that the second user is generating the third message, responsive to determining that the second user is generating the third message, notifying, by one or more computer processors, the second user that the first user is generating the second message, responsive to determining that the second user is generating the third message, providing, by one or more computer processors, the first user a real-time communication option with the second user, responsive to determining that the second user is generating the third message, providing, by one or more computer processors, the second user a real-time communication option with the first user, responsive to determining that the third message is associated with a new recipient, wherein the new recipient is not one of the two or more users, notifying, by one or more computer processors, the first user that the second message is associated with the new recipient, responsive to determining that the second user is no longer generating the third message, notifying, by one or more computer processors, the first user that the second user is no longer generating the third message, responsive to determining that the first user is generating the second message, determining, by one or more computer processors, whether a third user of the two or more users is generating a fourth message, wherein the fourth message is a response to the first message, determining, by one or more computer processors, that the third user is generating the fourth message, and receiving, by one or more computer processors, a privacy indication associated with the third user from the following: the sender of the first message and the third user.

\* \* \* \* \*